US011180127B2

(12) United States Patent
Farres et al.

(10) Patent No.: US 11,180,127 B2
(45) Date of Patent: Nov. 23, 2021

(54) HEAVY DUTY VEHICLE REDUNDANT BRAKING SYSTEM

(71) Applicant: VOLVO TRUCK CORPORATION, Gothenburg (SE)

(72) Inventors: Lionel Farres, Heyrieux (FR); Olivier Harrang, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 308 days.

(21) Appl. No.: 16/398,346

(22) Filed: Apr. 30, 2019

(65) Prior Publication Data
   US 2019/0337502 A1   Nov. 7, 2019

(30) Foreign Application Priority Data
   May 3, 2018   (WO) ............... PCT/EP2018/061283

(51) Int. Cl.
   *B60T 7/20*   (2006.01)
   *B60T 13/58*  (2006.01)
   (Continued)

(52) U.S. Cl.
   CPC ............. *B60T 13/58* (2013.01); *B60T 7/12* (2013.01); *B60T 7/20* (2013.01); *B60T 8/17* (2013.01);
   (Continued)

(58) Field of Classification Search
   CPC .... B60T 8/1708; B60T 13/263; B60T 13/268; B60T 13/385; B60T 13/683
   See application file for complete search history.

(56) References Cited

U.S. PATENT DOCUMENTS

| 6,644,758 B1 * | 11/2003 | Stumpe | B60T 8/327 |
| | | | 303/9.66 |
| 2019/0337502 A1 * | 11/2019 | Farres | B60T 13/683 |

(Continued)

FOREIGN PATENT DOCUMENTS

| DE | 102008009043 B3 | 5/2009 |
| EP | 2794368 B1 | 11/2015 |

OTHER PUBLICATIONS

International Search Report (dated Feb. 25, 2019) for priority application PCT/EP2018/061283.

*Primary Examiner* — Nicholas J Lane
(74) *Attorney, Agent, or Firm* — Withrow & Terranova, PLLC

(57) ABSTRACT

An electronically controlled pneumatic brake system for a vehicle, with a normal brake operating mode (NOM) and a backup brake operating mode (BKM), said system comprising:
a front axle brake module (FBM) for providing pneumatic control pressure to the left and right front pneumatic brake actuators (FW-L, FW-R), one or more rear axle brake module (RBM) for providing pneumatic control pressure to the left and right rear pneumatic brake actuators (RW-L, RW-R), a trailer brake interface (5),
an air production module (6) selectively providing air under pressure to said axles electronic brake modules (FBM, RBM) via first and second air supply circuits (AC1,AC2), a trailer relay valve (1), wherein each of the front and rear axle brake modules (FBM, RBM) is controlled by an electrical control signal (NBC, ES1, ES2) under the normal brake operating mode (NOM) and is controlled by a pneumatic backup brake control line (BKC) under the backup brake operating mode (BKM), wherein the output (12) of trailer relay valve is connected to the trailer brake interface (5) under the (Continued)

normal brake operating mode (NOM), and the output (12) of trailer relay valve is connected to the pneumatic backup brake control line (BKC) under the backup brake operating mode (BKM).

14 Claims, 7 Drawing Sheets

(51) Int. Cl.

| | | |
|---|---|---|
| *B60T 8/17* | (2006.01) |
| *B60T 13/68* | (2006.01) |
| *B60T 15/02* | (2006.01) |
| *F16K 11/065* | (2006.01) |
| *B60T 7/12* | (2006.01) |
| *B60T 13/26* | (2006.01) |
| *B60T 17/04* | (2006.01) |

(52) U.S. Cl.
CPC .......... *B60T 13/268* (2013.01); *B60T 13/683* (2013.01); *B60T 15/027* (2013.01); *F16K 11/065* (2013.01); *B60T 17/04* (2013.01); *B60T 2270/402* (2013.01); *B60T 2270/413* (2013.01)

(56) References Cited

U.S. PATENT DOCUMENTS

| | | | | |
|---|---|---|---|---|
| 2020/0023820 A1* | 1/2020 | Van Thiel | ............. | B60T 13/683 |
| 2020/0023827 A1* | 1/2020 | Van Thiel | ................ | B60T 7/04 |
| 2020/0070795 A1* | 3/2020 | Van Thiel | ................ | B60T 7/02 |
| 2020/0148180 A1* | 5/2020 | Van Thiel | ............. | B60T 13/662 |
| 2020/0361436 A1* | 11/2020 | Heer | .................... | B60T 15/027 |
| 2021/0078556 A1* | 3/2021 | Laine | .................... | B60T 13/662 |
| 2021/0122350 A1* | 4/2021 | Farres | ................... | B60T 7/085 |

\* cited by examiner

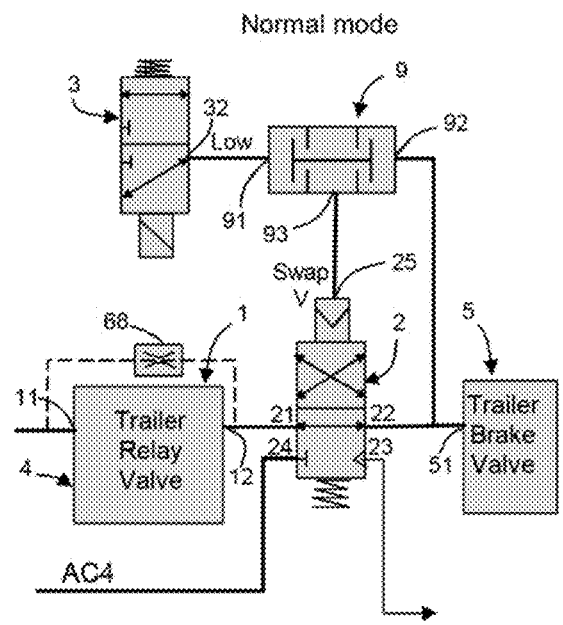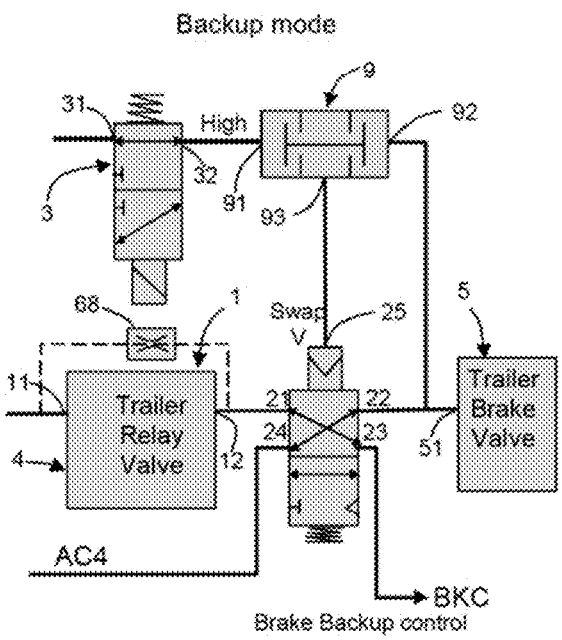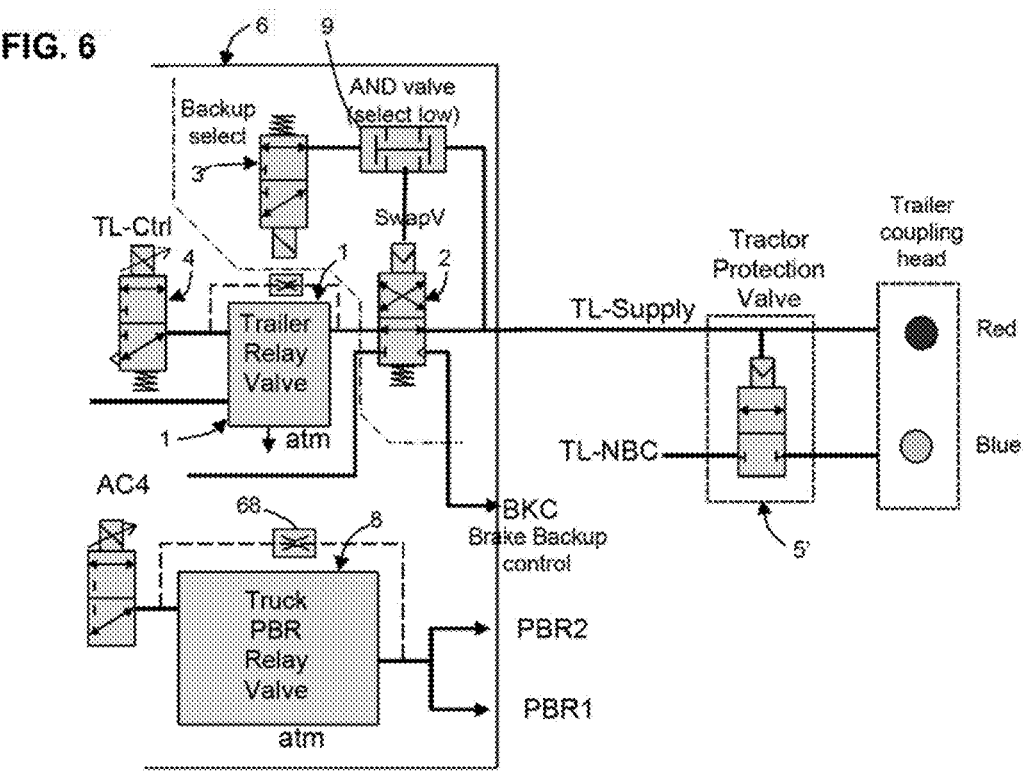

HEAVY DUTY VEHICLE REDUNDANT BRAKING SYSTEM

FIELD OF THE INVENTION

This invention relates to an electronically controlled pneumatic brake system for an automotive vehicle. This invention also relates to an automotive vehicle equipped with such a system.

BACKGROUND OF THE DISCLOSURE

In the field of automotive vehicles, reliable trajectory control is among the prominent safety features required for ensuring smooth and secure traffic on roads. More particularly, steering and braking functions are of utmost importance.

The present disclosure focuses more particularly on the braking function, which relies, in particular for trucks, and more generally for heavy duty vehicles, on an electro-pneumatic system using air under pressure as working fluid.

It has been made compulsory for long to provide two independent pneumatic circuits, as a redundant arrangement in order to keep a braking capability in case one circuit undergoes a failure.

Later, solutions using electric control on top of baseline pneumatic system were introduced to speed up pressure changes at axles, so the effective control at brake actuators can reflect driver controls in a more real time fashion.

More recently, a trend to go towards brake-by-wire solutions has lead the trucks designers to simplify the foot pedal brake unit by removing all the pneumatic components from the foot pedal unit, as taught in EP2794368. However, reliability and tolerance to failure(s) must still be ensured, especially in the area of electrical controls and pneumatic controls.

Now, with the outlook of autonomous vehicles and vehicle automation, the inventors have endeavored to find new solutions for providing redundant electro-pneumatic braking systems.

SUMMARY OF THE DISCLOSURE

According to one aspect of the present invention, it is disclosed an electronically controlled pneumatic brake system for an automotive vehicle, said system being configured to operate either under a normal brake operating mode (NOM) or under a backup brake operating mode (BKM), said system comprising:
  one or more front axle brake module (FBM) for providing pneumatic control pressure to the left and right front pneumatic brake actuators (FW-L, FW-R),
  one or more rear axle brake module (RBM) for providing pneumatic control pressure to the left and right rear pneumatic brake actuators (RW-L, RW-R),
  a trailer brake interface (5) and a coupling device for supplying air to a trailer (if/when coupled),
  an air production module (6) selectively providing air under pressure to said axles electronic brake modules (FBM, RBM) via at least a first air supply circuit (AC1) and a second air supply circuit (AC2), and to a trailer circuit,
  at least two air reservoirs (R1,R2), respectively connected to first and second air supply circuits,
  a trailer relay valve (1), having an output (12),
wherein each of the front and rear axle brake modules (FBM, RBM) is controlled by an electrical control signal (NBC, ES1,ES2) under the normal brake operating mode (NOM) and is controlled by a pneumatic backup brake control line (BKC) under the backup brake operating mode (BKM), characterized in that
the output (12) of trailer relay valve is connected to the trailer brake interface (5) under the normal brake operating mode (NOM), and the output of trailer relay valve is connected to the pneumatic backup brake control line (BKC) under the backup brake operating mode (BKM).

Thanks to this arrangement, it is possible to optimize the overall configuration of the braking system, and to selectively use the trailer relay valve and related components for two functions according to a current prevailing operating mode.

A relevant functional redundancy is therefore provided with few additional components in the pneumatic circuit.

By the term "trailer brake interface", it shall be understood either a trailer brake valve as used in the European standard (ref 5 FIG. 1) or a tractor protection valve as used in the US standard (ref 5' FIG. 6).

In various embodiments of the invention, one may possibly use in addition to one and/or other of the following arrangements, taken alone or in combination.

According to one aspect, the system comprises:
  a switchover auxiliary valve (2), for connecting selectively the output (12) of the trailer relay valve (1) either to the trailer brake interface (5) or to the a pneumatic backup brake control line (BKC), depending on the current operating mode (NOM, BKM), and controlled by at least:
  a backup mode selection valve (3).

This forms a simple and reliable solution to swap from one configuration to another configuration.

According to one aspect, the switchover auxiliary valve (2) is a 4/2 valve with four ports and two plunger positions, with a pneumatic control. Thanks to this arrangement, the trailer can still be supplied with air under pressure, even though the normal pneumatic line has been redirected to the truck brake backup control line.

According to one aspect, the backup mode selection valve (3) is an ON/OFF electro-valve, with its output (32) connected to the pneumatic control port (25) of the switchover auxiliary valve (2). Whereby the switch from one mode to another is made simple and easy to control.

According to an alternative aspect, the system may comprise a select low valve (9) with its output (93) connected to the pneumatic control port (25) of the switchover auxiliary valve. Whereby, the behavior during reset, during transient configurations, together with the default position(s) improves the dependability rating of the system.

According to one aspect, one input port (92) of the select low valve (9) is supplied by a park brake release line (99), and the other input port (91) of the select low valve (9) is supplied by the backup mode selection valve (3). Whereby, we make sure that the park brake is first released before the backup mode can be activated, contributing to the reliability of the pneumatic backup brake control line (BKC). In this configuration, backup brake operating mode (BKM) is not permitted when the park brake is applied and locked (PBR=0).

According to one alternative aspect, one input port (92) of the select low valve (9) is supplied by the supply line (50) to a trailer brake interface (5), and the other input port (91) of the select low valve (9) is supplied by the backup mode selection valve (3). Whereby, we make sure that the trailer brake interface is first pressurized before the backup mode can be activated, contributing to the reliability of the pneumatic backup brake control line (BKC). Further this configuration allows preventing an inadvertent braking of the trailer.

According to one aspect, the backup mode selection valve (3) is a normally open valve. Whereby, under lack of power supply or lack of control, the switchover auxiliary valve is caused to be in the backup mode configuration.

According to an alternative solution, the backup mode selection valve (3) can be a normally closed valve. In this case, its output can control directly the switchover auxiliary valve (2). Thereby, only few additional components are required.

According to one aspect, the backup mode selection valve (3) is controlled by an air production module control unit (61) housed in the air production module (6). Thereby, no other unit external to the air production module is necessary to control the selection of the backup brake operating mode (BKM). In the event brake control unit (73) and/or autonomous drive control units (71,72) fail, the air production module (6) can activate by its own the backup brake operating mode (BKM).

According to one aspect, the system may comprise a proportional trailer control solenoid valve (4), to provide a control pressure to the trailer relay valve (1).

Advantageously, this solenoid valve is used for making available the pneumatic backup brake control line (BKC) under the backup brake operating mode. The solenoid valve is preferably a proportional valve to output any desired control pressure between zero and 12 bars (standard pressure level available at the reservoirs).

According to one aspect, the trailer control solenoid valve (4) is controlled by the air production module control unit (61) housed in the air production module (6). This control solenoid valve can be controlled in a proportional way such its output can be any controlled pressure between 0 and the brake service pressure (e.g. 12 bars).

According to one aspect, the system may comprise
a service brake electric input device (16) delivering a first input electric signal (S16);
at least one electronic brake control unit (71,72,73) adapted to process the first input electric signal, and to deliver electrical control signals (NBC, ES1,ES2). Thereby, a brake-by-wire configuration is made available, with a foot brake pedal without any pneumatic component.

According to one aspect, at least one electronic brake control unit (71,72) is a vehicle autonomous drive control unit. The proposed redundant braking system opens many possibilities to practice safe autonomous drive.

According to one aspect, at the pneumatic backup brake control line (BKC) is output and controlled by the air production module (6), independently of the brake control unit (73) and/or autonomous drive control units (71,72). Functional redundancy is thereby achieved.

According to one aspect, the system may further comprise a truck parking brake relay valve (8). The parking brake function which is integrated within the APM can also be used as an emergency braking fallback system, thereby improving the overall functional redundancy.

According to one aspect, the system may further comprise:
a truck parking brake relay valve (8),
a parking brake electric input device (18) delivering a second input electric signal (S18),
an air production module control unit (61) adapted to process the second input electric signal (S18), and to deliver control signals to a proportional park brake control solenoid valve (89), which provides a control pressure to the parking brake relay valve (8). The parking brake function can also be used as an emergency braking fallback system, thereby improving the functional redundancy. The production module control unit (61) is a common resource to the parking brake function and to the backup pneumatic control (BKC).

According to an optional aspect, there may be provided with regard to the USA standards, an additional braking handle (19) in relation with the trailer brake control. Another way to apply brake to the trailer is thereby provided.

According to one aspect, the switchover auxiliary valve (2), the backup mode selection valve (3), and optionally the select low valve (9) are housed within the air production module (6). The APM is an integrated and optimized unit, providing protection against mechanical and fluids risks.

According to one aspect, there is provided a third air supply circuit (AC3) for providing a redundant pneumatic supply to the front and rear axle brake modules (FBM, RBM). Thereby, full redundancy is achieved, not only regarding the control lines but also regarding the supply in compressed air via the redundant third circuit supply. More precisely, the system can withstand a substantive electric failure and a substantive pneumatic failure while maintaining a full proportional braking capability on front and rear axles.

The invention is also directed to a vehicle including a brake system as described above.

BRIEF DESCRIPTION OF THE DRAWINGS

Other features and advantages of the invention appear from the following detailed description of two of its embodiments, given by way of non-limiting example, and with reference to the accompanying drawings, in which:

FIG. 5A shows a more detailed view of the area of the trailer relay valve under normal operating mode.

FIG. 5B is similar to FIG. 5A and shows the area of the trailer relay valve under backup operating mode.

FIG. 6 illustrates a variant embodiment for the trailer interface,

DETAILED DESCRIPTION OF THE DISCLOSURE

In the figures, the same references denote identical or similar elements. Unless stated otherwise, the pneumatic lines are shown thicker than the electrical lines.

Figure 1:
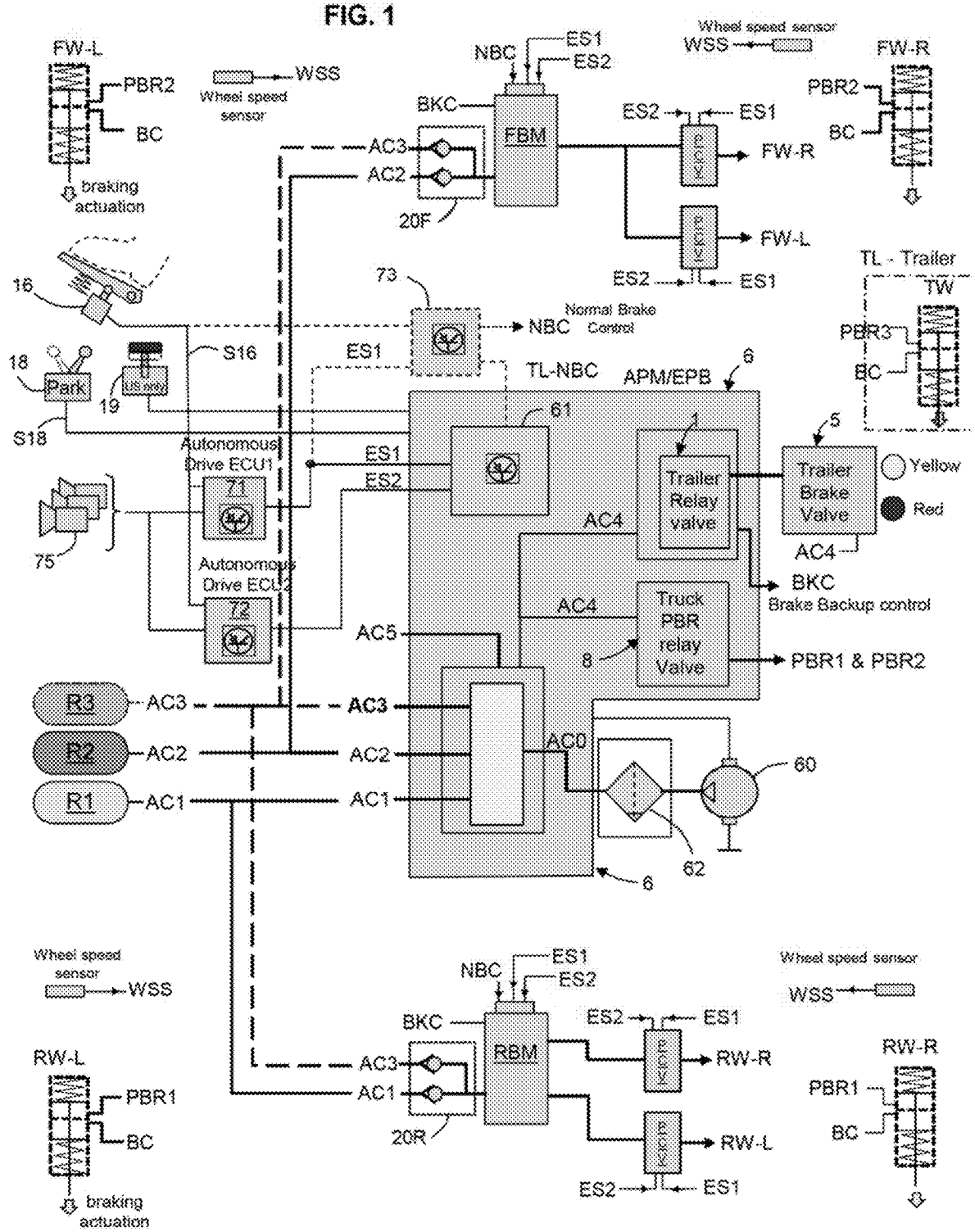
FIG. 1 illustrates a diagrammatical circuit layout of an electro-pneumatic braking system for a truck according to the invention.

FIG. 1 shows a diagrammatical circuit layout of an electro-pneumatic braking system for a truck. The proposed configuration is also valid for any kind of heavy-duty vehicles including buses and coaches.

The truck considered here can be the traction unit in a tractor/trailer configuration or it can be a utility 'carrier' truck.

At least one front axle is a steering axle, without excluding other axle(s) having a steering function including a rear axle.

The truck considered here can have one or more level(s) of autonomous drive functionalities, entailing reinforced needs for redundancy in braking systems.

Overview of the Braking System

Here we describe the braking system from the wheel to the source. For the sake of clarity we have represented the same brake actuator for all the wheels, but of course, there may be variations and differences according to the location of the wheel (front, rear, trailer etc . . . )

Figure 7:
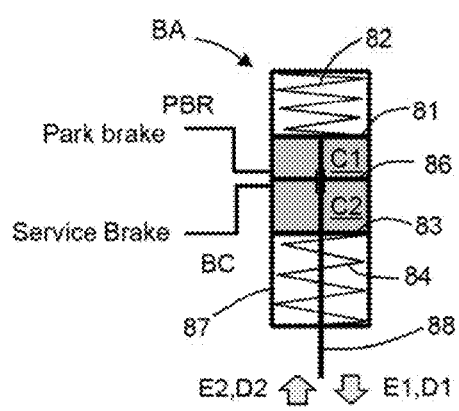
FIG. 7 illustrates a pneumatic brake actuator.

As known per se, all truck brakes actuators (RW-L, RW-R, FW-L, FW-R) can be combined service brake and park brake actuators. As shown in FIG. 7 each brake actuator (generically referred to as BA) includes a first piston 81 loaded by a first spring 82 which exerts a first effort E1 in a first direction D1. Brake actuator BA also includes a second piston 83 loaded by a second spring 84 which exerts a second effort E2 in a direction D2 opposite to direction D1. Piston 83 is rigid with an output rod 88 of brake actuator which drives an associated brake mechanism (brake pads, disc, etc . . . not shown). A fixed wall 86 is mounted within a housing 87 of brake actuator. Wall 86 defines, respectively with pistons 81 and 83, two chambers C1, C2 of a variable volume. The rod 88 is coupled to the piston 83, crosses the wall 86 in an air tight manner and is coupled to the piston 81. Springs 82 and 84 are chosen so that effort E1 is larger than effort E2. Thus, in absence of air pressure within chambers C1 and C2, effort E1 pushes piston 81 in direction D1. This effort is transmitted by piston 83 to rod 88 to actuate the associated brake mechanism in a first direction. Under such circumstances, brake mechanism engages the brake disk(s) or drum(s) of the associated rear left wheel or wheels. This corresponds to a park brake actuation for truck. In other words, when no air under pressure is provided to brake actuator BA, the park brake of truck is actuated. Instead of pistons, flexible membranes or diaphragms can be used.

When air under pressure is provided to chamber Cl supplied by input PBR (Parking Brake Release, respectively PBR2 or PBR1 for front and rear), the air pressure within this chamber pushes piston 81 against the action of spring 82 and spring 84 pushes piston 83 in direction D2. This corresponds to the release of the park brake of truck by air pressure. When the park brake has been released and if air under pressure is provided to chamber C2 supplied by input BC (Brake control), the air pressure within chamber C2 pushes piston 83 in direction D1 which progressively actuates brake mechanism in order to brake the corresponding wheel or wheels. The mechanical effort delivered by the actuator to the brake mechanism increases with the air pressure delivered to chamber C2. This corresponds to the actuation of the service brake of truck. The service brake actuator is the device which transforms the air pressure into a mechanical force.

Trailer brake actuator can be similar to truck brake actuator (supplied by PBR3 for parking brake).

There may be provided more than 4 brake actuators, in case there are two front axles, and/or two or more rear axles. The number of brake actuators can amount to 2, 4, 6, 8, or more. It is worth noting that some brake actuators can be deprived of the parking brake function. The number of brake actuators can be twice the number of axles.

In the illustrated example, each axle or group of axles is equipped with a brake module, e.g. in the illustrated example a front axle brake module FBM and one (or more) rear axle brake module RBM.

However, in other configurations (not shown), there may be provided one such brake module per wheel or one such brake module per twin wheels.

The front axle brake module FBM provides pneumatic control pressure to the left and right front pneumatic brake actuators (FW-L, FW-R). The rear axle brake module RBM provides pneumatic control pressure to the left and right rear pneumatic brake actuators (RW-L, RW-R).

Each of the front and rear axle brake modules (FBM, RBM) is an electro-pneumatic device, known per se, providing a pneumatic relay function. In short, it selectively takes air from the compressed air supply and selectively releases air to the atmosphere while following faithfully the control signals (electrical and/or pneumatic); its output is connected to the chamber C2 of the corresponding brake actuator BA.

There are provided a first air supply circuit AC1 and a second air supply circuit AC2.

There is provided a first air reservoir R1 coupled to the first air supply circuit AC1.

There is provided a second air reservoir R2 coupled to the second air supply circuit AC2.

Said otherwise, there are provided two air reservoirs (R1,R2, also called 'vessels'), respectively connected to first and second air supply circuits (AC1,AC2), which are designed to be independent from one another. First and second air supply circuits AC1,AC2, have a service pressure set around 12 bars. In practice, first and second air supply circuits AC1,AC2, may have a service pressure comprised in the range [5 bars-15 bars], preferably comprised in the range [7 bars-12 bars].

The first air supply circuit AC1 provides air under pressure to the rear axle brake module RBM. The second air supply circuit AC2 provides air under pressure to the front axle brake module FBM. AC1 is sometimes called 'primary' circuit, AC2 is sometimes called 'secondary' circuit, since rear brakes are usually more powerful than front brakes.

There is provided an air compressor 60, for compressing air taken from the environment; the output of the compressor goes through a filter/dryer 62; These components are known per se thus not described in detail here.

There are provided here various control units, namely a 'conventional' brake control unit 73, and one or two autonomous drive ECUs 71,72.

Figure 4:
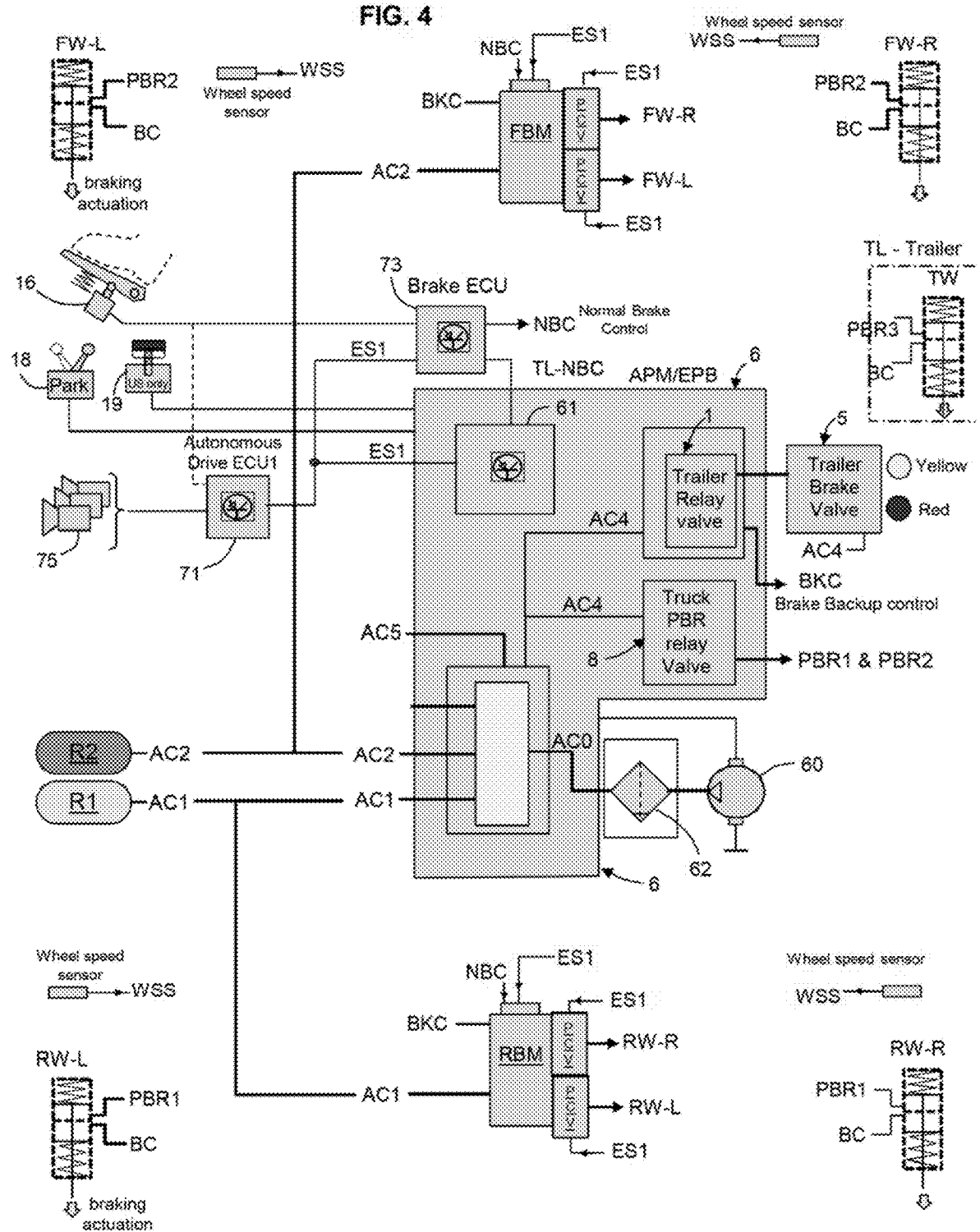
FIG. 4 is similar to FIG. 1 and shows a variant embodiment.

As apparent from FIG. 1 and FIG. 4, each of the front and rear axle brake modules FBM, RBM can be either in one integrated unit or in 3 physical units, with the PCV (pressure control valve) separated from the pneumatic relay function.

The PCV (pressure control valve) performs anti-locking function (ABS function). PCV has a first valve in a series arrangement that can block the passage or air down to the brake chamber, and a second valve that can take out air from the brake chamber circuit and release it to the atmosphere. These valves are controlled in accordance with the real time analysis of the speed of each wheel.

As shown in FIG. 1, the PCV (pressure control valve) are separated from the FBM which performs mainly a relay function (electrical+pneumatic control for this relay function).

As shown in FIG. 4, the PCV (pressure control valve) are integrated in the FBM and RBM respectively. Of course mixed configuration is possible.

There are provided wheel speed sensors WSS, at least one per braked wheel. Four are shown at the figures, but having more wheel speed sensors is possible.

The signals from the wheel speed sensors WSS are analyzed at one or more control unit which delivers output signals to control the valves of the respective PCV (pressure control valve). The control unit in charge of ABS regulation can be a local control unit within the front and rear axle brake modules FBM, RBM; it can also be the conventional brake control unit 73; it can also be one or both of the autonomous drive ECUs 71,72.

APM/EPB and its Relay Valves and Other Ancillaries

There is provided an air production module 6 ('APM' in short), preferably housing components inside a protective enclosure, thereby providing protection against mechanical and fluid attacks. The air production module 6 is located behind the cabin, accessible from one side of the truck for carrier type truck, or accessible from top side if/when cabin is tilted or rocked. The air production module 6 may comprise various valves, solenoids, relay valves, pressure sensor and a control unit 61.

The air production module 6 houses the core of the parking brake function and comprises the truck PBR relay valve 8. As known per se, there is provided a parking brake electric input device 18 outputting an electric signal S18, which is delivered to the control unit 61 of the APM 6.

There are provided output ports and/or lines denoted PBR1, PBR2 to distribute the park brake release pressure PBR to brake actuators. Alternatively they may be provided a single output or even a third output PBR3, however all these lines collectively denoted PBR, are supplied by the same pressure. As known per se, when pressure is supplied to these lines, the park brake is released and when no pressure is applied to these lines, the spring of the park brake apply a 'mechanical' park brake.

The control unit 61 of the APM 6 delivers in turn an appropriate signal to control a proportional park brake control solenoid valve 89 housed in the APM, which provides a control pressure to the parking brake relay valve 8.

There may be provided, with regard to the USA standard, an additional braking handle 19 ('red knob') in relation with the trailer brake control. A corresponding electric signal S19 is delivered to the control unit 61 of the APM 6.

For the air under pressure PP, coming from the compressor and filter, there is provided a trunk portion AC0. The trunk portion AC0 distributes air through overflow valves (not shown) to first and second air supply circuits AC1, AC2, and optionally to a third air supply circuit AC3. The third air supply circuit AC3 provides a redundant air supply to the front and rear axle brake modules FBM, RBM. AC3 is shown in dotted line in FIG. 1.

For the front section, a first double check valve 20F is arranged at the vicinity or within the front axle brake module FBM. FBM is supplied by the higher pressure of AC2 or AC3. For the rear section, a first double check valve 20R is arranged at the vicinity or within the rear axle brake module RBM. RBM is supplied by the higher pressure of AC1 or AC3.

However, the third air supply circuit is not compulsory, FIG. 4 illustrates a configuration with only the primary and secondary air circuits AC1, AC2.

Additionally, the trunk portion AC0 distributes air through an overflow valve to another air supply circuit denoted AC4 for supplying the truck PBR relay valve 8 and a trailer relay valve 1. Optionally, there may be provided another air supply circuit denoted AC5 for supplying the air suspension system and possibly other truck ancillaries. In addition, the air production module 6 may comprise various simple or double check valves, pressure limiters, purge circuits and likewise devices, etc. . . .

The output of the trailer relay valve 1 is coupled to a trailer brake valve 5. The trailer brake valve 5 is coupled to a coupling device (trailer coupling head, not shown) for supplying air to a trailer (if/when coupled). The trailer relay valve 1 has an input denoted 11, an output denoted 12 and a supply AC4. The input is supplied by a proportional trailer control solenoid valve 4 having an input 41 and an output 42.

The trailer brake valve 5 is controlled by a line 50 coming out of the APM, more precisely from the output of the trailer relay valve 1.

When line 50 is not under pressure (i.e. low pressure), the service brakes of the trailer are set. Conversely, when line 50 is under pressure (i.e. high pressure), the service brakes of the trailer are unset, and the wheels of the trailer can turn.

Figure 2A:
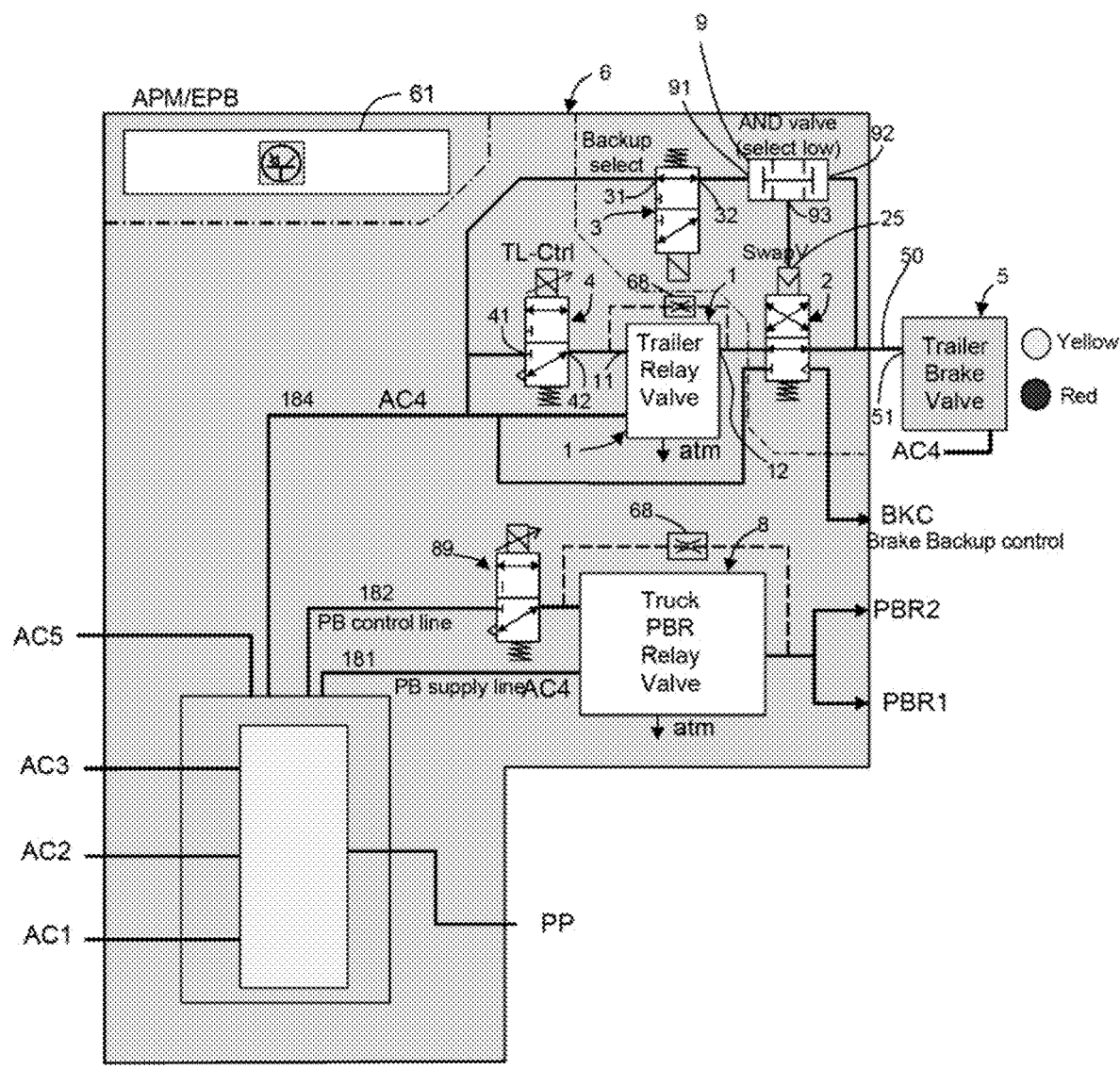
FIG. 2A shows a more detailed view of a particular portion of the air production module.

With reference to FIGS. 2A, 5A, 5B, there is arranged a switchover auxiliary valve 2, interposed functionally between the trailer relay valve 1 and the trailer brake valve 5. The switchover auxiliary valve 2 is denoted in short 'SwapV' on the drawings.

The switchover auxiliary valve 2 is here pneumatically controlled by a control port 25 and has four input/output ports 21-24. The switchover auxiliary valve 2 is a 4/2 type valve.

First port 21 is connected to the output 12 of the trailer relay valve 1. Second port 22 is connected to the input 51 of the trailer brake valve 5 via line 50. Third port 23 is connected to an outbound line called "pneumatic backup brake control line" BKC. Fourth port 24 is connected to the air supply circuit AC4.

There is provided a movable plunger with two positions. When the switchover auxiliary valve 2 is at rest (FIG. 5A), first and second ports 21,22 are in fluid communication, fourth port 24 is closed, third port 23 may be in communication with the atmosphere.

When the switchover auxiliary valve 2 is actuated under pressure from control port 25 (FIG. 5B), first and third ports 21,23 are in fluid communication, second and fourth ports 22,24 are in fluid communication. Under this condition the trailer brake valve 5 is controlled by the air supply circuit AC4 (at somewhat constant pressure), and pneumatic backup brake control line BKC is supplied by the controlled pressure delivered by the trailer relay valve 1. We note that since the input 51 of the trailer brake valve 5 is pressurized, the trailer is not braked through this line, but the trailer can still be braked properly by another line.

Stated otherwise, the output 12 of trailer relay valve 1 can be connected selectively to the trailer brake valve 5 or to the pneumatic backup brake control line BKC, upon control port 25 status.

There is provided a backup mode selection valve 3, controlled by the control unit 61 of the production module 6. In the illustrated example, the backup mode selection valve 3 is an ON/OFF electro-valve, with a pneumatic input 31 and a pneumatic output 32.

With reference to FIGS. 2A, 5A, 5B, the backup mode selection valve 3 supplies the switchover auxiliary valve 2 via a Select Low valve 9. The Select Low valve 9 is of a known type, performing an overall 'AND' function by selecting the lowest pressure available on its two inputs. The pneumatic output 93 of the Select-Low valve 9 is pressurized only if first input port 91 is pressurized AND second input port 92 is pressurized.

The pneumatic output 32 of the backup mode selection valve 3 is connected to a first input port 91 of the select low valve 9. The other input port 92 of the select low valve 9 is connected to the second port 22 of the switchover auxiliary valve 2. Said otherwise, the second input port 92 of the select low valve 9 is connected to trailer supply line 50.

The pneumatic output 93 of the select low valve 92 is connected to the control port 25 of the switchover auxiliary valve 2.

The backup mode selection valve 3 is here a normally open valve. In normal operating mode NOM, this backup mode selection valve 3 is electrically powered therefore pneumatically closed. If there is a need to select the backup mode BKM (whatever the type of failure) electrical control is stopped on valve 3, then pneumatic state will be open thereby selecting the backup mode (input 91 is then pressurized at select-low valve 9) and if also trailer is supplied (second input port 92 pressurized).

Thanks to the low select valve 9, the switchover auxiliary valve 2 can only be caused to be activated if, beforehand, both AC4 is supplied and the trailer control solenoid valve 4 is controlled and the trailer relay valve 1 delivers pressure at its output.

Figure 2B:
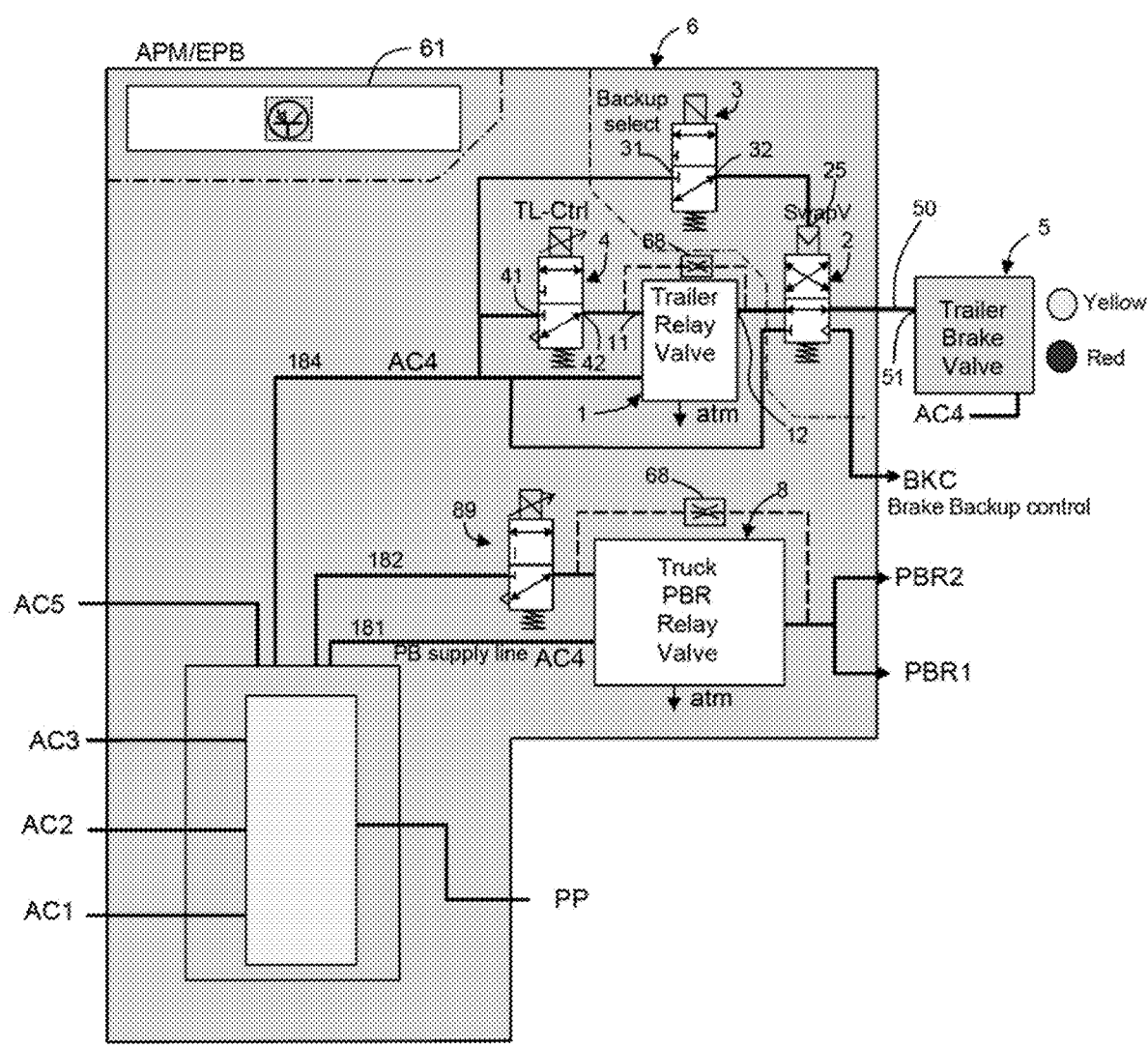
FIG. 2B is similar to FIG. 2A and shows a variant embodiment.
Figure 3:
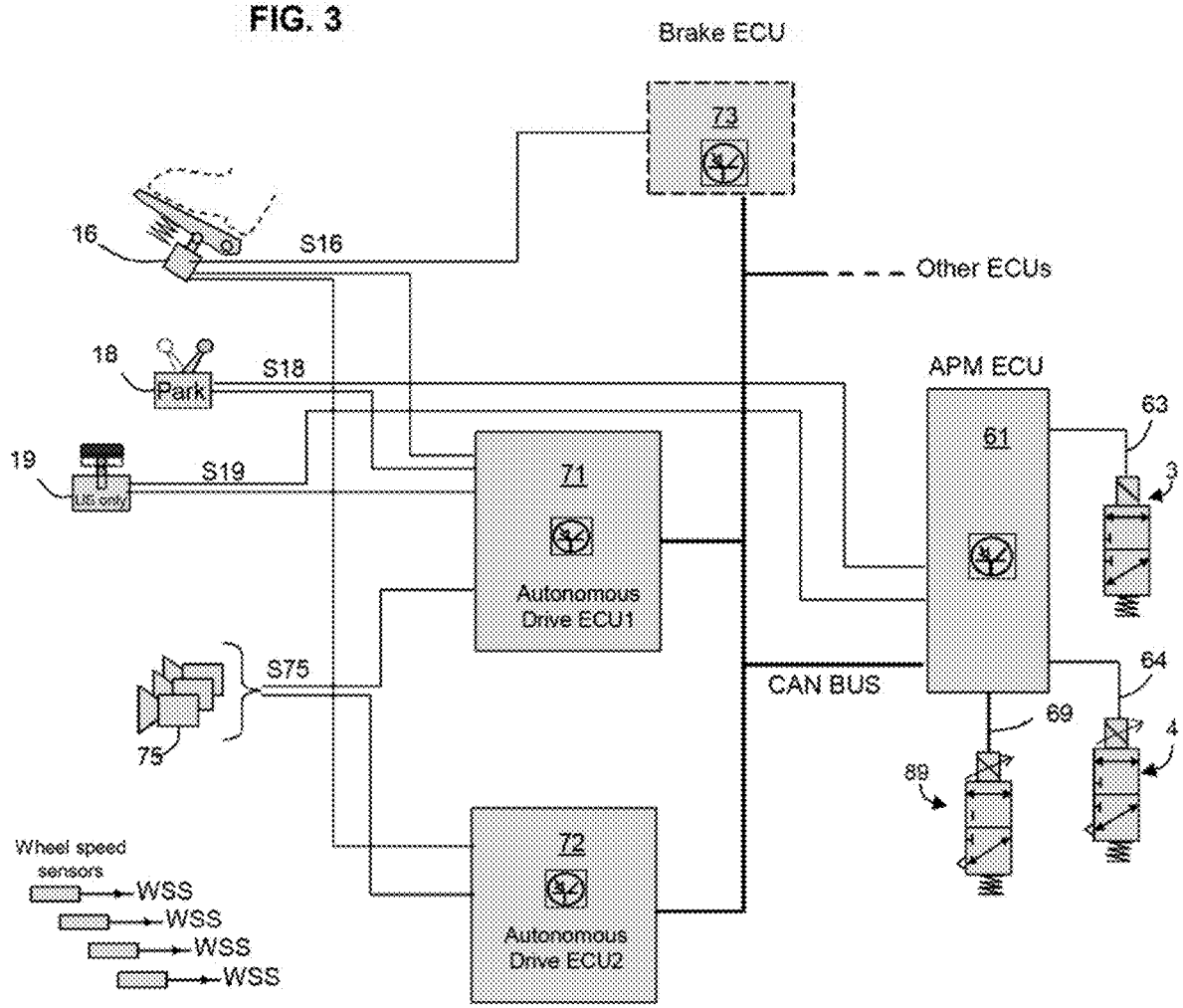
FIG. 3 illustrates an electrical and functional diagram.

With reference to FIG. 2B, the backup mode selection valve 3 has its pneumatic output 32 connected directly to the pneumatic control port 25 of the switchover auxiliary valve 2.

The backup mode selection valve 3 is here a normally closed valve. In this case, the control unit 61 operates with another appropriate logic.

Normal Brake Mode and Backup Brake Mode and Swap Therebetween

The brake system comprises a service brake electric input device 16 (formed generally as a brake foot pedal) delivering a first input electric signal S16. The brake system comprises one or more electronic brake control units (71, 72,73) adapted to process the first input electric signal S16, and to deliver one or more electrical control signals (NBC, ES1, ES) to the front and rear axle brake modules FBM, RBM.

Depending on the level of autonomous drive capability, there may be provided a conventional brake control unit 73, in charge of handling, electric signal S16 from the brake foot pedal, and in charge of delivering a braking control signal (named here NBC for normal brake control) to users such as FBM, RBM, trailer circuit.

Additionally, there may be provided autonomous drive control units 71,72, as redundant units which work either in a parallel mode or in a master/slave mode.

According to one example, electrical control signals delivered by first autonomous drive control unit 71 are denoted ES1, electrical control signals delivered by second autonomous drive control unit 72 are denoted ES2.

First and second autonomous drive control units 71,72, rely at least on cameras 75 which provides a flow of images S75 which are analyzed in autonomous drive control units 71,72. There may be provided other type of sensors like radars, lidars, or the like inertial sensors, and also communication data received from various traffic aware entities (from fixed or mobile entities).

Each of the front and rear axle brake modules (FBM, RBM) is controlled by the above mentioned electrical control signals (NBC and/or ES1 and/or ES2) under a normal mode called "normal brake operating mode" NOM.

Whenever this normal mode is not fully operative, in particular from an electrical problem, disruption/lack of electrical supply at the electronic brake control units (71, 72,73), from the perspective of at least one of to the front and rear axle brake modules FBM, RBM, there is provided in the system an alternative mode called backup brake operating mode BKM.

Advantageously, each of the front and rear axle brake modules (FBM, RBM) can be controlled by a pneumatic backup brake control line BKC under the backup brake operating mode BKM.

Since the brake foot pedal 16 is not configured to deliver pneumatic signals, the inventors have found a way to use the existing trailer relay valve 1 to fulfil the generation of an appropriate pneumatic backup brake control line.

More precisely, under the normal brake operating mode NOM, the output 12 of trailer relay valve 1 is connected to the trailer brake valve 5.

But whenever the backup brake operating mode BKM is necessary (i.e. under the backup brake operating mode BKM), the control unit 61 controls the backup mode selection valve 3 to open or close (respectively FIG. 2A, 2B), the output of backup mode selection valve 3, if relevant via the low select valve 9, controls pneumatically the switchover auxiliary valve 2, the latter changes to the actuated state (FIG. 5B), and the output 12 of trailer relay valve is connected to the pneumatic backup brake control line BKC.

Therefore, with reference to the above description, under the normal brake operating mode NOM, the output 12 of trailer relay valve 1 is connected to the trailer brake valve 5 (trailer brake 'interface' as generic term), and under the backup brake operating mode BKM the output 12 of trailer relay valve is connected to the pneumatic backup brake control line BKC.

It should be noted that the pneumatic backup brake control line BKC is output and controlled by the air production module 6, independently of the brake control unit 73 and/or autonomous drive control units 71,72.

It should be noted that under the backup brake operating mode BKM, we use the service brake function and not the park brake function. Said otherwise, the proposed backup solution is not a downgraded braking function; controlled dispense of brake pressure to service brake function is maintained.

The control unit 61 of the APM 6 may take the decision to go to backup brake operating mode BKM whenever it does not receive expected proper electrical signals from the other electronic control units. For example the control unit 61 of the APM 6 may expect to receive "I'm alive & healthy" signal from the brake control unit 73 and/or from one or more of the autonomous drive control units 71,72, and in the case those signals are not properly received, control unit 61 of the APM 6 may control the backup mode selection valve 3 so that the switchover auxiliary valve 2 is switched to backup brake operating mode BKM.

Figure 8:
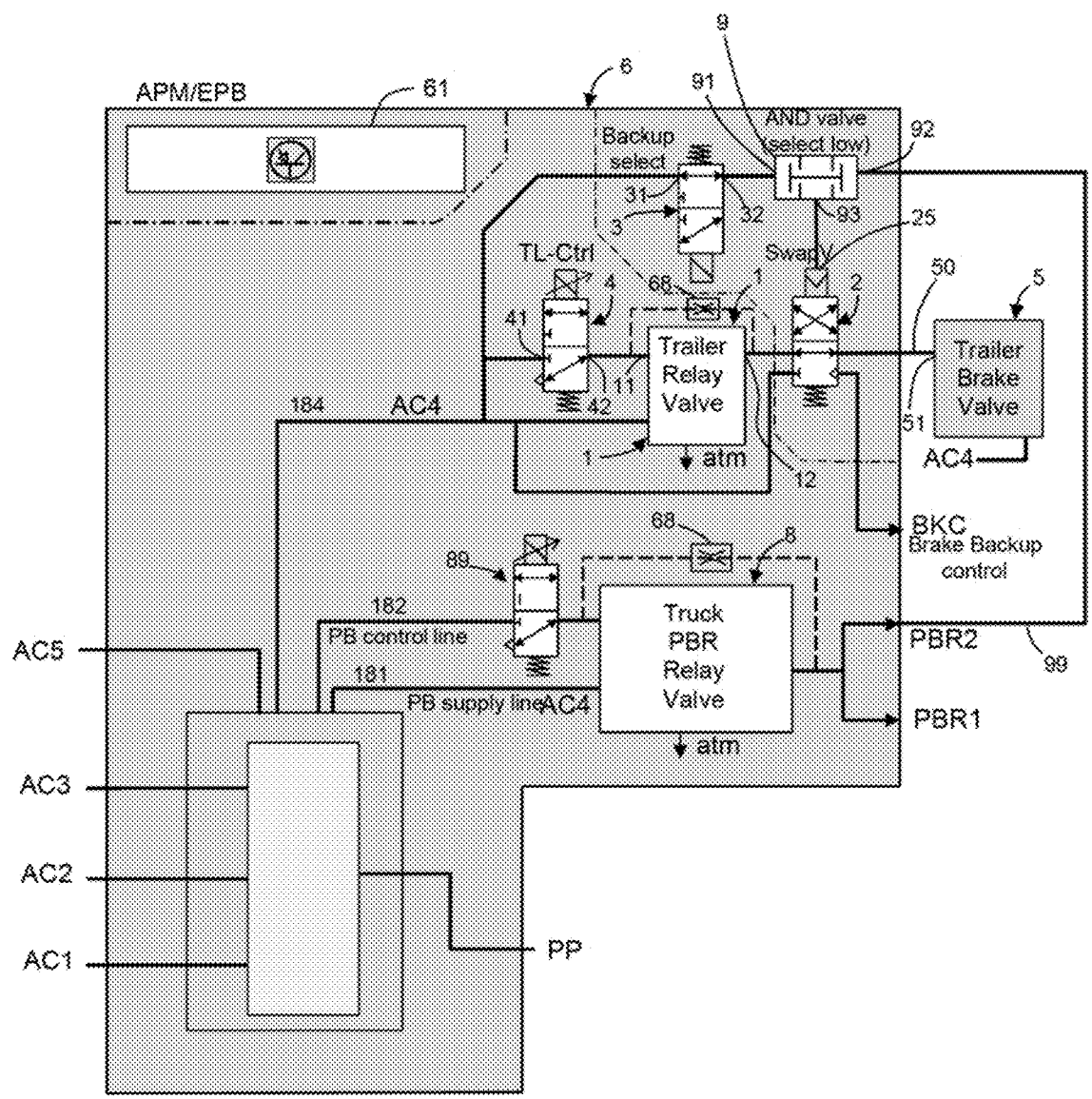
FIG. 8 is similar to FIG. 2A and shows a variant embodiment.

FIG. 8 shows a variant embodiment. The second input 92 of the select-low valve 9 is here connected to a park brake release line 99 (instead of trailer brake interface supply line 50 in FIG. 2A). In the normal operating mode NOM, the backup mode selection valve 3 is electrically powered therefore pneumatically closed. If there is a need to select the backup mode (whatever the type of failure) the backup selection valve 3 is no longer controlled electrically and becomes pneumatically open.

When backup selection valve 3 is pneumatically open, input 91 pressurized at select-low valve 9, and the output 93 is pressurized with an extra condition: the park brake shall be released (second input 92 pressurized).

We note here that if the backup mode BKM is already selected, an electrical failure regarding the supply/control of the backup selection valve 3 does not change the current mode, and backup mode BKM is maintained.

The park brake state is a stable position: either applied or released. Therefore, only when the brake is released, i.e. in driving conditions, the backup mode can be selected. When the truck is parked, Swap valve 2 will remain at rest position (normal control of trailer interface) whatever the state of backup mode selection valve 3.

Miscellaneous

On the relay valves (1,8), a back end loop circuit is provided with a restriction 68. This ensures stability of the pneumatic control and discards some inadvertent transients.

As shown in FIG. 6, in the braking system according to US standard, unlike the trailer brake valve already described above, there is provided as trailer brake interface a tractor protection valve 5'. In this configuration the second port 22 of the switchover auxiliary valve 2 is connected directly to the trailer coupling head-red hand-, and is also connected to the control port of the tractor protection valve 5'. Thanks to this valve, the normal braking line TL-NBC is connected to the trailer coupling head-blue hand-when pressure is supplied in the TL-Supply Line.

References 181,182,184 denote the internal pneumatic lines within the air production which respectively supply the parking brake relay valve 8, the proportional park brake control solenoid valve 89, the trailer relay valve 1, the proportional trailer control solenoid valve 4, the backup mode selection valve 3.

The proportional park brake control solenoid valve 89 is controlled by control unit 61 through line 69; the proportional trailer control solenoid valve 4 is controlled by control unit 61 through line 64; the backup mode selection valve 3 is controlled by control unit 61 through line 63.

The pneumatic brake system described above constitutes the main service brake system of the vehicle which is used to slow down and to stop the vehicle during normal operation, whatever the speed of the vehicle. The park brake system is used mainly to maintain the vehicle stopped when it is not in use. As discussed above, the park brake system can be least partly combined with the service brake system; nevertheless, a park brake system can be independent of the service brake system, it can for example comprise a system for blocking the vehicle transmission.

Heavy-duty vehicles, such as trucks and buses, are also often equipped with a deceleration system, which is only capable of slowing down a vehicle, but often not capable of effectively stopping the vehicle completely within a reasonable distance. Such deceleration systems, such as hydrodynamic brakes or electro-dynamic brakes, are mostly efficient when the vehicle is riding above a certain speed. Such deceleration systems are by essence different from the pneumatic brake system described above.

The invention claimed is:

1. An electronically controlled pneumatic brake system for an automotive vehicle, the system being configured to operate either under a normal brake operating mode or under a backup brake operating mode, the system comprising:

one or more front axle brake modules for providing pneumatic control pressure to the left and right front pneumatic brake actuators, one or more rear axle brake modules for providing pneumatic control pressure to the left and right rear pneumatic brake actuators, a trailer brake interface and a coupling device for supplying air to a trailer, an air production module selectively providing air under pressure to the axles electronic brake modules via at least a first air supply circuit and a second air supply circuit and to a trailer circuit, at least two air reservoirs, respectively connected to the first and second air supply circuits, a trailer relay valve, having an output, and a switchover auxiliary valve, for connecting selectively the output of the trailer relay valve either to the trailer brake interface or to a pneumatic backup brake control line, depending on the current operating mode, and controlled by at least a backup mode selection valve, and wherein each of the front and rear axle brake modules is controlled by an electrical control signal under the normal brake operating mode and by the pneumatic backup brake control line under the backup brake operating mode, the output of the trailer relay valve is connected to the trailer brake interface under the normal brake operating mode, and the output of the trailer relay valve is connected to the pneumatic backup brake control line under the backup brake operating mode.

2. The brake system of claim 1, wherein the switchover auxiliary valve is a 4/2 valve with four ports and two plunger positions, with a pneumatic control.

3. The brake system of claim 1, wherein the backup mode selection valve is an ON/OFF electro-valve, with its output connected to a pneumatic control port of the switchover auxiliary valve.

4. The brake system of claim 1, further comprising a select low valve with its output connected to a pneumatic control port of the switchover auxiliary valve.

5. The brake system of claim 4, wherein one input port of the select low valve is supplied by a park brake release line, and the other input port of the select low valve is supplied by the backup mode selection valve.

6. The brake system of claim 4, wherein one input port of the select low valve is supplied by a supply line to trailer brake interface, and the other input port of the select low valve is supplied by the backup mode selection valve.

7. The brake system of claim 1, wherein the backup mode selection valve is a normally open valve wherein the backup mode selection valve is controlled by an air production module control unit housed in the air production module.

8. The brake system of claim 1, further comprising a proportional trailer control solenoid valve, to provide a control pressure to the trailer relay valve.

9. The brake system of claim 1, further comprising:
a service brake electric input device delivering a first input electric signal;
at least one electronic brake control unit adapted to process the first input electric signal, and to deliver electrical control signals towards the front and rear axle brake modules.

10. The brake system of claim 9, wherein the pneumatic backup brake control line is output and controlled by the air production module, independently of the electronic brake control unit and/or autonomous drive control units.

11. The brake system of claim 1, further comprising:
a truck parking brake relay valve,
- a parking brake electric input device delivering a second input electric signal, and
- an air production module control unit adapted to process the second input electric signal, and to deliver control signals to a proportional park brake control solenoid valve, which provides a control pressure to the parking brake relay valve.

12. The brake system according to claim 1, wherein a switchover auxiliary valve, a backup mode selection valve, and optionally where applicable a select low valve are housed within the air production module.

13. The brake system of claim 1, further comprising a third air supply circuit for providing a redundant pneumatic supply to the front and rear axle brake modules.

14. A Vehicle comprising the system of claim 1.

* * * * *